Sept. 13, 1927.
A. L. BEARD
LOCK.
Filed Feb. 18, 1925
1,642,480
5 Sheets-Sheet 1
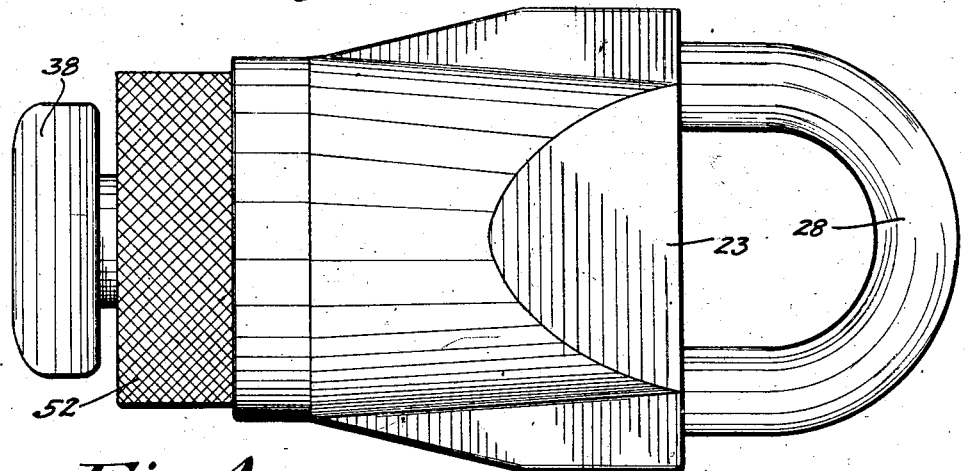
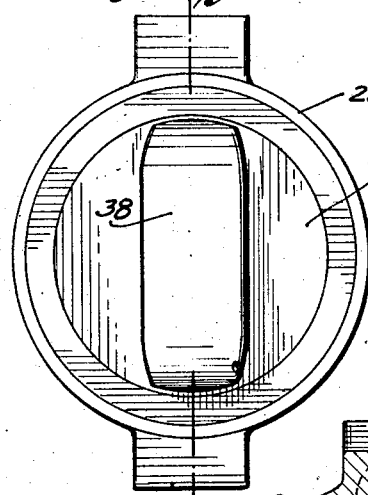
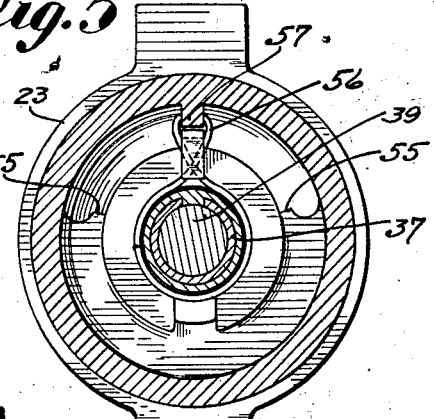
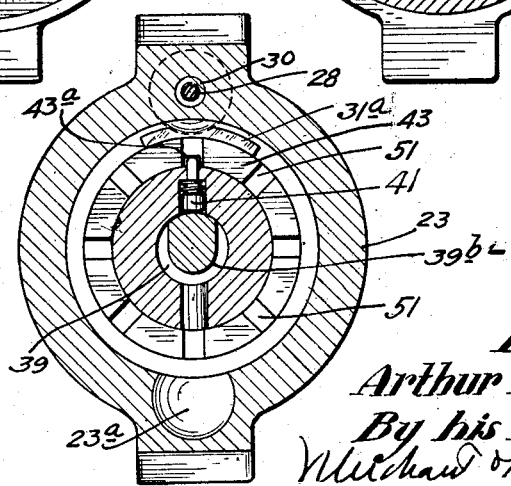
Inventor
Arthur L. Beard
By his Attorneys Sept. 13, 1927.  A. L. BEARD  1,642,480
LOCK
Filed Feb. 18, 1925   5 Sheets-Sheet 2
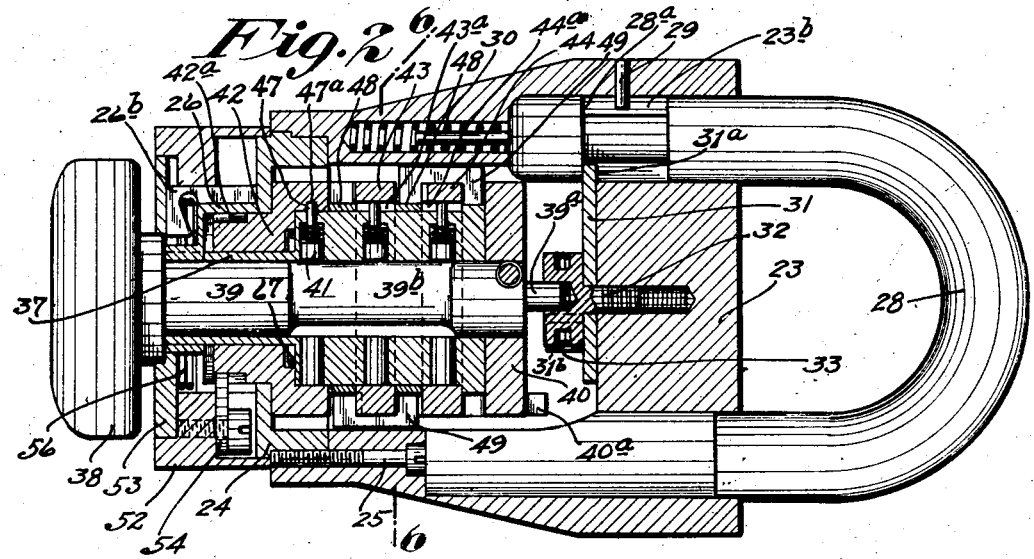
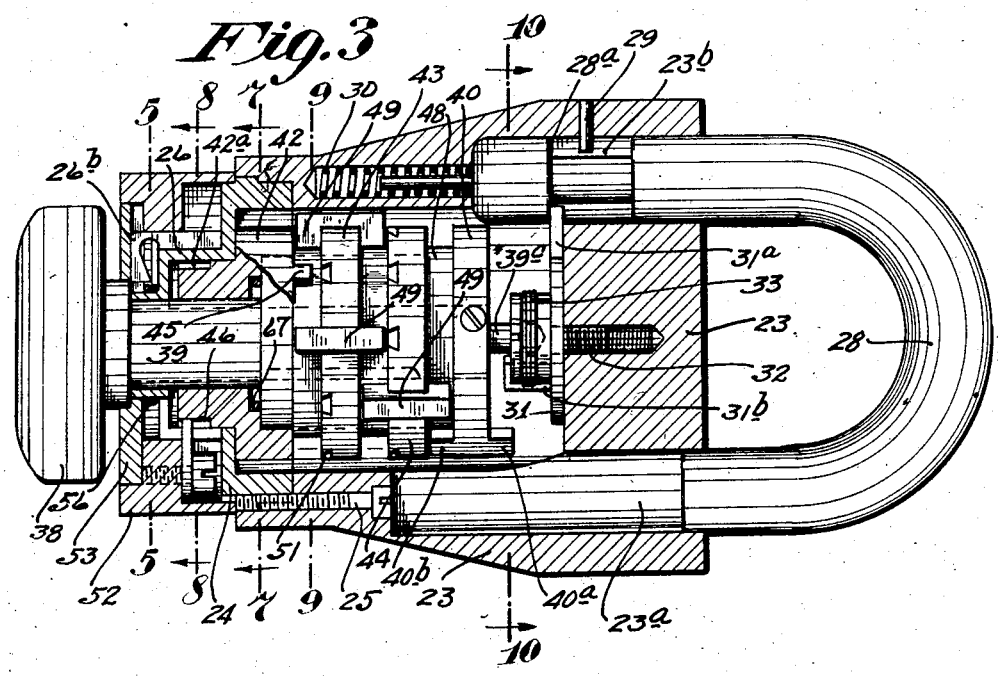
Inventor
Arthur L. Beard
By his Attorneys Sept. 13, 1927.   1,642,480
A. L. BEARD
LOCK
Filed Feb. 18, 1925    5 Sheets-Sheet 3
Fig.18
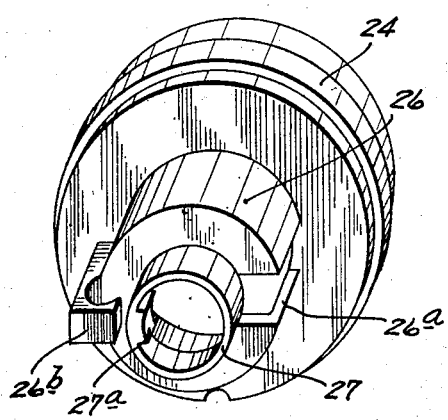
Fig.19
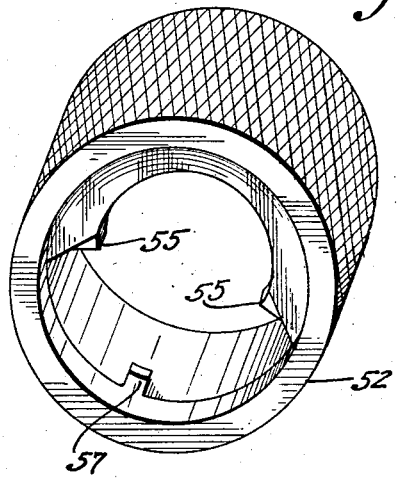
Fig.8
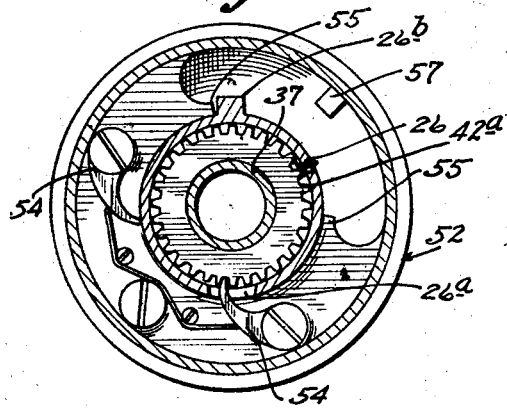
Fig.7
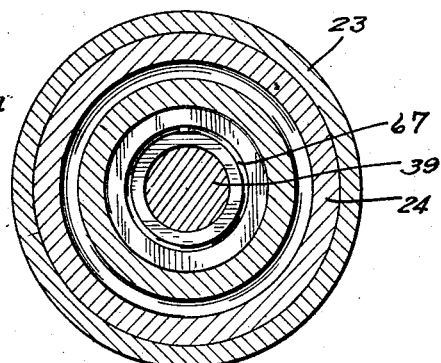
Fig.9
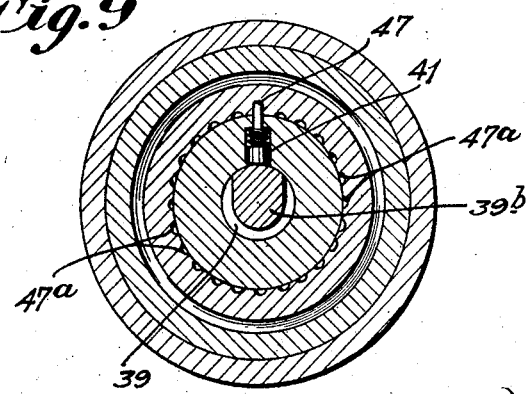
Fig.3ᵃ
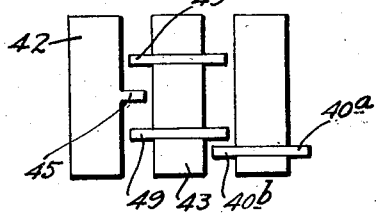
Inventor
Arthur L. Beard
By his Attorneys Sept. 13, 1927. 1,642,480
A. L. BEARD
LOCK
Filed Feb. 18, 1925 5 Sheets-Sheet 4
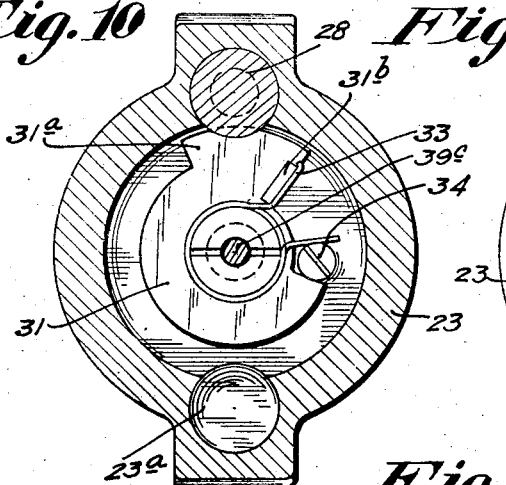
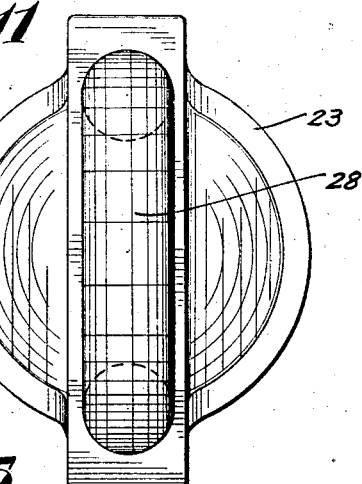
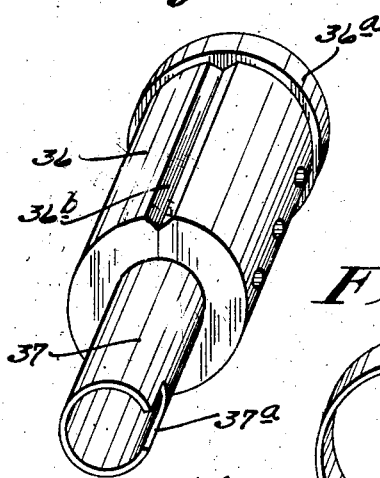
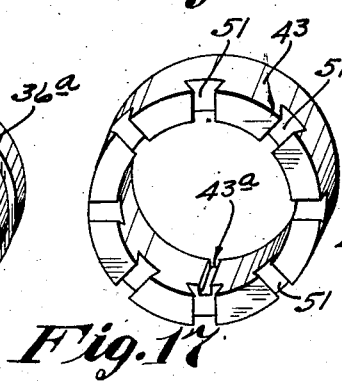
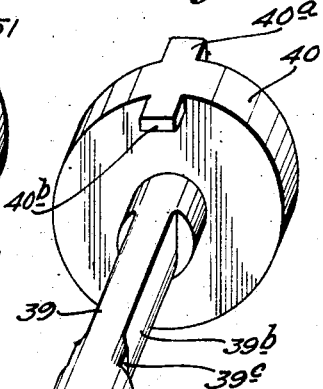
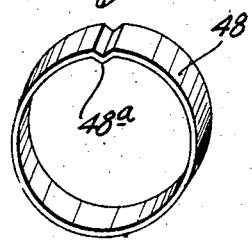
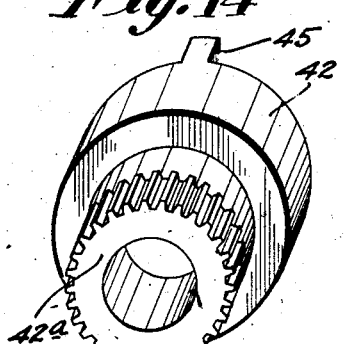
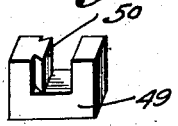
Inventor
Arthur L. Beard
By his Attorneys Sept. 13, 1927.  
A. L. BEARD  
LOCK  
Filed Feb. 18, 1925  
1,642,480  
5 Sheets-Sheet 5
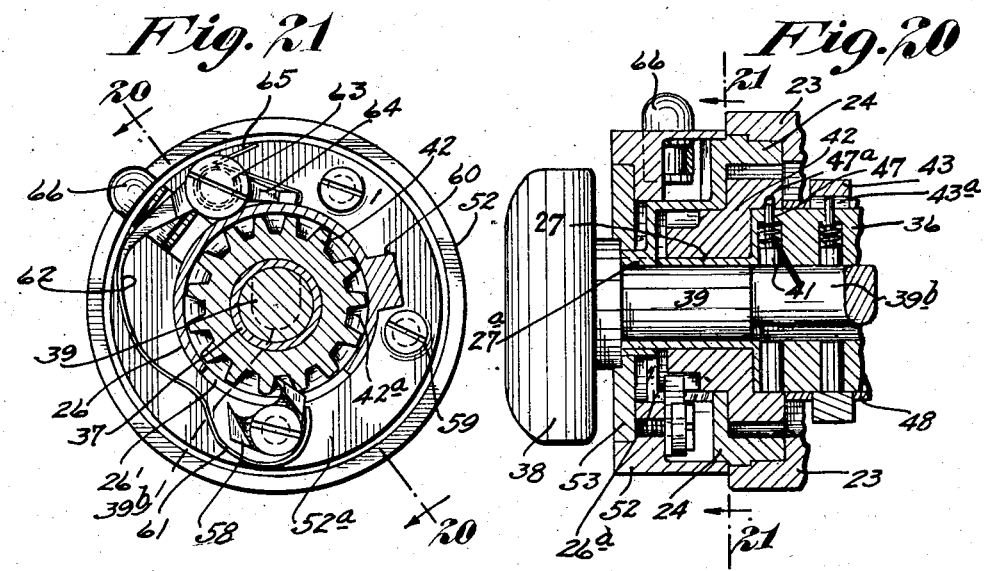
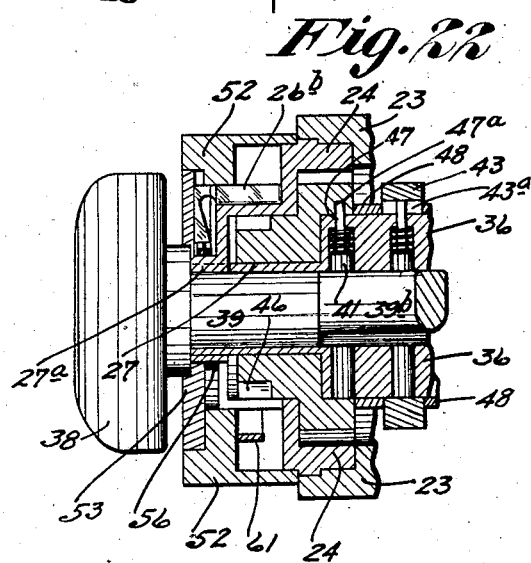
Inventor  
Arthur L. Beard  
By his Attorneys Patented Sept. 13, 1927.

1,642,480

UNITED STATES PATENT OFFICE.

ARTHUR L. BEARD, OF MINNEAPOLIS, MINNESOTA.

LOCK.

Application filed February 18, 1925. Serial No. 10,122.

My invention relates to permutation or combination locks, that is, to locks having tumblers or movable elements and not requiring the use of a key for the manipulation thereof. In these permutation or combination locks, it is the general practice to provide a single or common operating knob or tumbler-operating element and in the "working" of the lock, such knob or tumbler actuator has required various different predetermined movements and it has been necessary to carefully observe, either by watching index marks or listening to a succession of clicks, to enable the manipulator to determine when the lock has been properly manipulated. A lock, the operation of which is guided by vision, cannot be operated in the dark, and a lock, the operation of which is indicated by sound or clicking action, cannot be operated by a person not having a keen hearing or a very delicate sense of feeling and, moreover, such indicators, under the most favorable conditions, require very close and careful following and mistakes in the manipulation thereof are always very likely to occur.

My invention, in the above noted respects and in others, makes a radical departure, both in the construction and plan of manipulation of combination or permutation locks. A salient feature consists in providing a common tumbler-operating knob or actuator, which, in the manipulation of the lock, requires only a predetermined number of similar or repeated movements, preferably first in the one direction and then in the other. For instance, the knob or actuator, at each movement, is given a repeated or like throw against a stop or motion-limiting means, so that the manipulator need only repeat the movements the desired number of times to work or release the lock. This improved lock may be made in all sorts of sizes and in various different designs, but for illustrative purposes, I have, in the accompanying drawings, shown the lock mechanism as incorporated in a padlock.

In the following specification, the word "tumbler" is used in a broad sense to include the differentially movable lock-releasing elements, regardless of their details of construction or operative arrangement. The term "tumbler actuator" is used in a broad sense to include a knob or other device, by means of which the tumblers can, by the proper manipulation, be set in lock-releasing positions. The term "lock actuator" is used in a broad sense to include a knob or element by the manipulation of which, when the tumblers are set for their release, the lock bolt or securing element of the lock may be removed into releasing position. The "lock detents" are the elements or devices, which, at all times except when the tumblers are set for the release of the lock, hold or prevent the lock from being released. In the improved lock hereinafter described, these lock detents enter into an important combination with the tumblers and the lock actuator. Said lock detents, in the best arrangement of the lock mechanism, are mounted in the non-rotary core around which the tumbler is arranged to oscillate, and except when the tumblers are set for release, hold the lock actuator against such movement as is required to release or open the lock; but, nevertheless, within the broad scope of the invention as just above outlined, the lock detents might be elements or structural features of the tumblers themselves.

Of course, all of the said devices may perform functions additional to those just noted.

In the drawings, wherein like characters indicate like parts throughout the several views, Fig. 1 is a plan view showing a padlock embodying the invention;

Fig. 2 is an axial section of the lock taken on the line 2—2 of Fig. 4, the lock actuator and the lock bolt or bow being shown in full;

Fig. 3 is a view corresponding to Fig. 2, but with the tumblers, as well as the lock actuator and lock staple, being shown in full;

Fig. 4 is a left end elevation of the lock shown in Fig. 1;

Fig. 5 is a transverse section on the line 5—5 of Fig. 3;

Fig. 6 is a transverse section on the line 6—6 of Fig. 2;

Fig. 7 is a section on the line 7—7 of Fig. 3;

Fig. 8 is a section on the line 8—8 of Fig. 3;

Fig. 9 is a section on the line 9—9 of Fig. 3;

Fig. 10 is a section on the line 10—10 of Fig. 3;

Fig. 11 is a right end elevation of the lock as shown in Fig. 1, directions being taken in respect to Figs. 1, 2 and 3;

Fig. 12 is a perspective showing what is herein designated as the lock actuator;

Fig. 13 is a perspective view of the non-rotary tumbler-supporting core;

Fig. 14 is a perspective of the primary tumbler of the lock;

Fig. 15 is a perspective showing one of the secondary tumblers, with its driving lug removed;

Fig. 16 is a perspective of the driving lug removed from Fig. 15;

Fig. 17 is a perspective of one of the tumbler-spacing rings;

Fig. 18 is a perspective of the tubular supplemental case section;

Fig. 19 is a perspective of the tumbler actuator;

Fig. 20 is a view corresponding to Fig. 2, but with some parts broken away and illustrating a modified construction;

Fig. 21 is a transverse section on the line 21—21 of Fig. 20;

Fig. 22 is a view corresponding to Fig. 20, but illustrating different positions of certain of the parts; and Fig. 3$^a$ is a diagrammatic view showing the several tumblers, lugs and immediately cooperating devices.

The padlock illustrated in Figs. 1 to 19, inclusive, will first be described.

This padlock comprises a hollow main case section 23 provided at its normally open end with a tubular or hollow supplemental case section 24, that is telescoped partly into the same and, as shown, is rigidly secured thereto by a machine screw 25 having a concealed head. This supplemental section 24, (see particularly Figs. 2, 3 and 18) has an outstanding hollow cylindrical barrel 26 and a still further reduced and further axially projecting sleeve portion 27, all of which parts 23, 26 and 27 are concentric to a common axis. The barrel 26 has a quite large peripheral notch 26$^a$ and a rigidly secured projecting stop lug 26$^b$, while the sleeve 27 has an internal lug 27$^a$, the purposes of which will hereinafter appear.

At its solid end, the main lock case section 23 has parallel bores 23$^a$ and 23$^b$ to receive the parallel prongs of the padlock bow or yoke 28. The long leg of the bow 28 is seated in the bore 23$^b$ and is formed with a long annular groove 28$^a$. A stop pin 29, inserted from the exterior of the case section 23, limits the axial outward movement of the bow 28, but permits the same to move outward far enough to carry the short end of the bow 28 out of the bore 23$^a$; and a coiled spring 30, set into the case section 23, tends to project said bow to its released position just indicated and in which released position the bow can be rotated on its long leg and, hence, freely inserted into or removed from the staple of a lock hasp or the like.

When the lock is set, the bow will be held in its locked position shown in Figs. 1 and 2, by a suitable lock element, which, in the particular illustration given, is an oscillatory disc 31, (see particularly Figs. 2, 3 and 10), pivoted to the interior of the solid head of the lock case 23 by a screw 32. The lock disc 31 has an outstanding segmental portion 31$^a$, which, when the lock is set, projects into the groove 28$^a$ of the bow 28 and positively prevents the same from being moved outward far enough to release its short leg from the bore 23$^a$. The lock segment 31$^a$ can be released from the lock bow 28 by movement in a clockwise direction from the position shown in Fig. 10. Normally, said lock segment 31 is held in its operative position shown in Fig. 10 by a torsion spring 33, shown as coiled about the hub of the disc 31 with one arm engaging a lug 31$^b$ of the disc 31 and with its other arm engaging a stop screw 34 secured to the solid head of the case section 23 and normally engaged by a shoulder on the disc 31, which latter limits the movement of said disc in a counterclockwise direction in respect to Fig. 10. The lock disc 31 has a projecting lug 31$^b$, the purpose of which, as will hereinafter appear, is to permit said disc to be moved to a bow or lock-releasing position, by the lock actuator presently to be described.

Mounted within the case sections 23 and 24, concentric to the axis of the latter and to the axis of the screw 32, is a non-rotary cylindrical core 36 provided with a long axially projecting sleeve 37 of greatly decreased diameter, that is extended through the sleeve 27 of the case section 24 and is provided with a notch 37$^a$ that fits the lug 27$^a$ of said sleeve 27 and whereby said core is positively held against rotation in respect to the lock case sections 23 and 24.

The lock actuator here illustrated is in the form of a knob 38 having a cylindrical stem 39 extended through and rotatively mounted in an axial bore formed in the core 36 and its sleeve 37. At its extreme inner end, the stem 39 has a reduced trunnion 39$^a$ that engages an axial seat in the head of the screw 32, so that the latter affords a bearing for the inner end of said stem, and through said trunnion and stem 39, the inner end of the core 36 is held in true axial alignment with the lock case and cooperating elements. The core 36, at its extreme inner end, has a stop flange 36$^a$ and just inward thereof the stem 39 has a rigidly secured head 40 shown as in the form of a disc provided with oppositely projecting lugs 40$^a$ and 40$^b$, for purposes that will presently appear. Here, however, it may be stated that the lug 40ª, under a certain manipulation hereinafter described, will engage the lug 31ᵇ of the lock disc 31 and move the segment 31ª of the latter to a bow-releasing position.

For a very important purpose, presently to appear, the intermediate portion of the U-stem 39 is reduced so that it forms a sort of flattened eccentric 39ᵇ—39ᶜ, that acts directly upon the heads or enlarged inner ends of inwardly spring-pressed lock detents 41, of which, as shown, there are three. These lock detents 41 are mounted for radial movements in the large portion of the core 36 and their reduced ends are arranged to be projected outward through the exterior of said core, each for cooperation with a lock tumbler.

In the lock illustrated, there are three annular lock tumblers 42, 43 and 44. The tumbler 42, which is farthest at the left in respect to Figs. 2 and 3, operates as a primary tumbler, while the other two tumblers 43 and 44 operate as secondary tumblers. The primary tumbler 42 is journaled on the body and sleeve portions of the core 36—37 and it has a reduced hub portion extended into the barrel 26 of the case section 24 and formed with a spur gear 42ª. The teeth of the gear 42ª are exposed for engagement through the notch 26ª of the barrel 26. At its large or inner end, the primary tumbler 42 is provided with a driving lug 45 that projects toward the tumbler 43. The numeral 46, (see Figs. 2 and 3), indicates a spring washer that acts as a friction device between the non-rotary core 36 and the primary tumbler 42. By reference to Figs. 2, 3 and 9, it will be seen that the large inner portion of the primary tumbler 42 works around the left-hand lock detent 41 and is formed with one deep internal notch 47 and with a plurality of circumferentially spaced shallow notches or depressions 47ª that will engage in succession with the outer end of the said left-hand detent 41.

The secondary tumblers 43 and 44 are in the form of rings rotatively mounted on the core 36 and normally holding the intermediate and right-hand lock detents 41 inwardly pressed. Said tumblers 43 and 44 are each formed with an internal notch 43ª and 44ª, which, when aligned with the respective detents, permit the same to be forced outward, as shown in Fig. 2. Spacing rings 48, (see Figs. 2 and 17), are placed on the core 36 between the first and second and second and third tumblers, directions being taken from right to left in respect to Fig. 2. To hold the spacing rings 48 against rotation, and so that the movement of the one tumbler will not frictionally move another tumbler, the spacing rings 48 are shown as provided with in-pressed portions 48ª that are engageable with a groove 36ᵇ of the core 36.

The tumblers 43 and 44 are provided with circumferentially adjustable lugs 49 that adapt the lock to be set for various different combinations and the combination to be changed whenever desired. As illustrated, the said lugs 49 are formed as best shown in Fig. 16, the same being of rectangular U-shape so that they embrace the respective tumblers and being provided with dove-tailed flanges 50 that engage in dove-tailed radial grooves 51 of the said tumblers 43 and 44. The lugs applied as best shown in Fig. 3 will project from both sides of the tumblers to which they are applied. Preferably and as shown, the tumbler 43 is provided with two of the said lugs 49 arranged with the lug 45 of the primary tumbler 42 to work circumferentially between them, (see particularly Figs. 3 and 3ª).

In the arrangement of lugs shown in Fig. 3ª, it will be assumed that two steps of movement of the primary tumbler 42 are required to move its lug 45 from engagement with one into engagement with the other of the two lugs 49 carried by the tumbler 43.

The tumbler actuator here employed is in the form of an annular knob 52 that is mounted to oscillate on the reduced cylindrical portion 26 of the supplemental case section 24 and is held against axial displacement by a washer-like head 53, (see particularly Figs. 2 and 3), which, in turn, is mounted on the further reduced cylindrical portion 27 of said supplemental case section 24 and is seated against the hub of the knob 38.

The annular knob 52 is recessed and its web carries a pair of reversely acting spring-pressed driving dogs or pawls 54, (see Figs. 3 and 8), that normally run on the exterior of the above noted non-rotary cylindrical portion 26 but are arranged to engage through the opening 26ª with the teeth 42ª of the primary tumbler 42, at or approximately at the limits of the extreme oscillatory movements of said tumbler-actuating knob 52. Extreme oscillatory movements of the knob 52 are limited by engagement of circumferentially spaced stop surfaces 55 thereof with the fixed lug 26ᵇ on the non-rotary part 26, (see Figs. 8, 18 and 19).

Although not absolutely necessary, it is very desirable that the actuating knob 52 be automatically returned and normally held in its intermediate or central position and this, as shown, is accomplished by a torsional spring 56 shown as coiled around the non-rotary cylindrical portion 27 with its end portions engaged on opposite sides of the fixed lugs 26ᵇ and its extreme free ends engaged with an internal lug 57 carried by or formed on the actuator knob 52, (see particularly Figs. 5 and 19). From its intermediate position shown in Fig. 5, the knob 52 is adapted to be oscillated in either direction, as far as permitted by engagement with one or the other of its stop surfaces 55 with the lug 26ᵇ, and as already indicated, at the extreme of such oscillatory movement in either direction, one or the other of the driving dogs 54 will engage a tooth 42ᵃ of the primary tumbler 42 and impart to said primary tumbler one step of movement in the direction of movement of said actuating knob.

Obviously, whenever the knob 52 has been given an extreme movement and released, the spring 56 will instantly throw the same back to its neutral position shown in Fig. 5, in which neutral position both of the driving dogs 54 will be on the exterior of the cylindrical portion 26 and will be thereby held out of action.

Operation.

Before giving a concrete example of the operation of this lock, the following statements should be made.

The so-called "lock actuator" or knob 38 performs the additional important function of a tumbler-resetting knob or device. When this knob 38 is rotated in a counter-clockwise direction in respect to views such as 4, 5, 6, 10 and 12, the lug 40ᵇ will engage the adjacent side of the lug 49 of the tumbler 44 and will pick up the tumbler 44 to engage the lug of the tumbler 43, thereby picking up said tumbler 43 and causing its lug to engage the lug 45 of the primary tumbler 42. When the uncut back portion of the flattened or eccentric section 39ᵇ of the stem 39 of the knob 38 strikes against the inner ends or heads of the detent pins 41, further movement of said knob and of the tumblers will be positively stopped and the said tumblers will then all be set in zero positions and, of course, all of the detent pins will be out of line with their releasing notches in the respective tumblers. In the action just noted, the knob 38 or so-called lock actuator performs its function of a tumbler-resetting device.

Before describing the lock-releasing action, attention is called to the fact that the knob 38 and its stem may be oscillated in a clockwise direction far enough to cause the lug 40ᵃ to engage and move the lock disc 31 to a bow or lock-releasing position when and only when the several tumblers 43 and 44 are set to lock-releasing positions, to wit: in positions in which the detent-releasing notches or recesses 47, 43ᵃ and 44ᵃ of the respective tumblers 42, 43 and 44 are in line with the outer ends of the cooperating detent pins 41. The action whereby the said tumblers are set in the lock-releasing positions just described, by manipulation of the tumbler-actuating knob 52, will now be described and, for the purposes of the present illustration, we shall assume that the combination for which the lock is set to work is 7—5—1. More specifically stated, it will be assumed that the tumbler-actuating knob 52 is to be given from its neutral position seven repeated oscillations as far as it will go in a clockwise direction, then five repeated oscillations from in its neutral position as far as it will go in a counter-clockwise direction, and finally one oscillation as far as it will go again in a clockwise direction. When the several tumblers are set in their zero positions, their driving lugs 45, 49 and 40ᵇ will be in contact. Hence, under the seven repeated oscillations in a clockwise direction, all three of the tumblers 42, 43 and 44 will be given seven steps of movement in a clockwise direction; and here it may be stated that the tumbler 44 has then been set in its lock-releasing position and will remain in that position while the other two tumblers are being finally adjusted to lock-releasing positions. When the tumbler-actuating knob 52 is given its five successive movements in a counterclockwise direction, the primary tumbler 42 will be given five backward steps of movement in a counter-clockwise direction, but the first two movements of said tumbler 42 will move its lug 45 only from engagement with one into engagement with the other of the lugs 49 of the tumbler 43, so that said tumbler 43 will be given only three steps of counterclockwise or backward movements under the five steps of counterclockwise movement given to the primary tumbler 42, and here attention is called to the fact that said tumbler 43 has then been set in its lock-releasing position and will remain in that position while the primary tumbler 42 is being adjusted to its lock-releasing position.

As a final lock-releasing operation, the tumbler-actuating knob 52 will be given one movement in a clockwise direction as far as it will go, thereby imparting to the primary tumbler 42 one step of movement in a clockwise direction, thereby setting the same in its lock-releasing position. From what has been said, it must, of course, be understood that when the three tumblers are thus set in lock-releasing positions, the deep releasing notch 47 of the tumbler 42 will be aligned with its detent pin 41, the notch 43ᵃ of the tumbler 43 will be aligned with its cooperating detent pin 41, and the notch 44ᵃ of the tumbler 44 will likewise be aligned with its cooperating detent pin 41, and when said notches are aligned with their cooperating detent pins, said detent pins will be moved outward by oscillating or turning the lock-releasing knob 38 so as to cause the uncut portion of the flattened eccentric 39ᵇ to cam the said detent pins against the tension of the springs into the cooperating notches, as best shown in Fig. 2. This action, of course, permits the knob 38 to be rotated far enough to cause the lug 40ᵃ to engage the lug 31ᵇ and turn the lock disc 31 out of the path of movement of the shouldered inner end of the long leg of the lock bow 28. This permits the spring 45 to force the shouldered inner end of said bow against the stop pin 29 but with the short leg of said bow projected out of the cooperating seat 23ª, thereby releasing the bow so that it may be freely rotated on its long leg and removed from or applied to a cooperating lock element.

As already indicated, the adjustable lugs 49 on the tumblers 43 and 44 may be set for any desired combination. Attention may be here called to the fact that the screw 25, which connects the secondary case section 24 to the primary case section 23, can be reached with a screw driver to effect the separation of the case sections when and only when the bow 28 is released, moved axially outward and then rotated so as to carry its short leg out of line with the seat or bore 23ª. This affords a protection against tampering with the lock elements when the lock is applied and locked, but permits easy separation of the case sections at proper times, for the purpose of changing the combination. Removal of the screw 25 is the only means whereby the two case sections may be separated or access had to the vital parts of the lock.

It is probably obvious, but attention is here called to the fact that the lock can be released only when all three tumblers are set in lock-releasing positions, for if any one of the tumblers be even slightly out of position, its cooperating detent pin cannot be moved outward far enough to permit the lock-actuating knob 38 to be given that oscillatory movement required to move the lock disc 31 to its releasing position. In fact, the detents 41 that cooperate with the tumblers 43 and 44 cannot be given any outward movement except when said tumblers 43 and 44 are in lock-releasing positions. The so-called "blind" or "dummy" notches 47ª in the primary tumbler 42 will all permit the first or left-hand detent pin 41 to be given slight outward movements but not far enough to permit the knob 38 to act upon or release the lock disc 31. One purpose of these shallow or dummy notches is to prevent a person not knowing the combination from detecting that position of the primary tumbler in which it in itself may be set in a lock-releasing position. However, said dummy notches 47ª perform another function, to wit: If the said first or left-hand detent pin 41 be given its slight outward movement into one of the dummy notches 47ª of the primary tumbler 42, by manipulation of the knob 38, the detent pin thus outwardly moved will lock the said primary tumbler so that it cannot be moved either in the one direction or the other by manipulation of the tumbler-actuating knob 52. This prevents all possibility of picking or discovering the combination for which the lock is set by experimental manipulation of the knobs or actuating elements of the lock.

Obviously, any desired number of tumblers may be employed and various other changes and modifications may be made, all within the scope of the invention as herein claimed. The number of teeth 42ª, which have a double-ratchet action on the primary tumbler 42, may be increased or decreased, at will. The tumblers themselves may take various forms. The lock illustrated being a padlock employs the so-called bow or yoke. It is, in fact, one of the final locking elements of the complete lock mechanism, which in other forms of the lock would take the form of a lock bolt, latch or other element, all of which, so far as this invention is broadly concerned, would be equivalent devices.

From these statements, it is evident that the vital parts of the lock mechanism may be incorporated in numerous and various different types of locks and may be made in all sorts of sizes and used for various different purposes.

The lock mechanism illustrated in Figs. 20, 21 and 22 is like that already described, with the following exceptions, to wit:

The annular lock-actuating knob 52, instead of having reversely acting circumferentially spaced driving dogs, is provided with a single double-ended reversible driving dog 58 pivoted to the web 52ª of said knob 52. This dog 58 is engageable with the teeth 42ª of the primary tumbler through a long segmental notch 26' in the non-rotary cylindrical portion 26. The web 52ª of the tumbler-actuating knob 52, in this arrangement, is shown as provided with stop screws 59 that are engageable with a lug 60 on the non-rotary cylindrical portion 26. The reversible dog 58 is subject to the looped end 61 of a spring 62 that is pivoted to the web 52ª of the tumbler actuator 52 at 63. The solid pivoted end portion of the spring 62 has an extended finger 64 that is yieldingly pressed by a sear spring 65 coiled about the pivotal connection 63 and reacting against the interior of the knob 52 and against the finger 64 with a force that tends to hold said spring 62 in the position shown in Fig. 21, in which position the free end of the spring loop 61 is pressed against the dog 58, thereby yieldingly holding the dog for driving action in a counter-clockwise direction. The numeral 66 indicates a finger-operated button that works radially through the shell of the tumbler actuator 52 and is notched so that it engages the solid end portion of the spring 62. When the button 66 is pressed inward, it shifts the spring 62 so that the spring bow 61 will engage the left-hand end of the dog 58, thereby yieldingly pressing the latter so that it will then be held for driving action in a clockwise direction.

With this modified arrangement the tumblers will be set to proper releasing positions by imparting full oscillatory movements of the tumbler actuator 52 first in the one direction and then in the other and by pressing the button 66 inward for certain of the said oscillatory movements. The pressing inward of the button 66 is performed by a finger of the hand engaging the actuating knob 52 and may be performed by the operator, unseen by any observer, so that the observer cannot detect the working of the combination by counting the number of movements in the one direction or the other, given to the tumbular-actuating knob. Of course, the operator must know the number and order of movements to be given to the actuating knob 52 with the button 66 in normal position and in depressed positions.

What I claim is:

1. A combination lock having tumblers arranged to be set in lock-releasing positions by predetermined step by step movements, and a tumbler actuator arranged for repeated like movements which when performed in predetermined order and number set the tumblers in lock-releasing positions.

2. A combination lock having tumblers arranged to be set in lock-releasing positions by predetermined step by step movements, a tumbler actuator arranged for repeated like movements which when performed in predetermined order and number set the tumblers in lock-releasing positions, and a lock actuator which may be operated to release the lock when and only when the tumblers are in lock-releasing position.

3. A combination lock having tumblers arranged to be set in lock-releasing positions by predetermined step by step movements, a tumbler actuator arranged for repeated like movements which when performed in predetermined order and number set the tumblers in lock-releasing positions, and a lock actuator which may be operated in one direction to release the lock when and only when the tumblers are in lock-releasing positions, and which lock actuator by a reverse movement is operative to set the tumblers in zero positions.

4. In a combination lock, the combination with a final lock element, of tumblers arranged to be set in lock-releasing positions by predetermined step by step movements, and a tumbler actuator arranged for repeated like movements which when performed in predetermined order and number set the tumblers in lock-releasing positions.

5. The combination with a final lock element, of tumblers arranged to be set for lock-releasing position by predetermined step by step movements, a tumbler actuator arranged for repeated like movements which when performed in predetermined order and number set the tumblers in lock-releasing positions, and a lock actuator which may be operated to release the lock when and only when the tumblers are in lock-releasing position.

6. In a combination lock, the combination with a final lock element, of tumblers arranged to be set in lock-releasing positions by predetermined step by step movements, a tumbler actuator arranged for repeated like movements which when performed in predetermined order and number set the tumblers in lock-releasing positions, and a lock actuator which may be operated in one direction to release the final lock element when and only when the tumblers are in lock-releasing positions and which lock actuator by a reverse movement is operative to set the tumblers in zero positions.

7. A combination lock having tumblers arranged to be set in lock-releasing positions by predetermined step by step movements, and a tumbler actuator arranged for repeated like movements which when performed in predetermined order and number set the tumblers in lock-releasing positions, the said tumblers being arranged in primary and secondary order and having cooperating lugs whereby the one will operate the other.

8. A combination lock having tumblers arranged to be set in lock-releasing positions by predetermined step by step movements, and a tumbler actuator arranged for repeated like movements which when performed in predetermined order and number set the tumblers in lock-releasing positions, said tumblers being arranged in primary and secondary order and having cooperating lugs whereby the one will operate the other, said tumbler actuator having a driving dog and the primary tumbler having ratchet-acting teeth subject to said dog, whereby said primary tumbler is given one step of movement for each repeated movement of said tumbler actuator.

9. The structure defined in claim 4 in which said tumbler actuator is provided with a driving dog and one of said tumblers is provided with cooperating ratchet teeth, said tumblers having cooperating elements whereby the one will impart movement to the other.

10. The structure defined in claim 7 in which the primary tumbler has ratchet-acting teeth and said tumbler actuator is provided with a driving dog operative on said teeth to impart one step of movement to said primary tumbler for each repeated movement of said tumbler actuator.

11. The structure defined in claim 2 in combination with a driving dog carried by the tumbler actuator, and cooperating ratchet-acting teeth on the primary members of said tumblers.

12. The structure defined in claim 2 in combination with a driving dog carried by the tumbler actuator, and cooperating ratchet-acting teeth on the primary members of said tumblers, the said tumbler actuator being operative on the primary tumbler under both directions of movement.

13. The structure defined in claim 7 in which the primary tumbler has ratchet-acting teeth and said tumbler actuator is provided with a two-way tooth-engaging member operative on said primary tumbler at the extremes of movement in both directions.

14. A combination lock comprising a relatively fixed core having therein a plurality of radially movable detents, tumblers rotatively mounted on said core and having detent-releasing recesses which when aligned with the cooperating detents set the lock for release, said tumblers having engaging parts whereby the one will move the other, the primary tumbler having ratchet-acting teeth, an oscillatory tumbler actuator arranged for repeated like movements and provided with a driving dog operative on said ratchet teeth to impart step by step movements to said primary tumbler.

15. A combination lock comprising a relatively fixed core having therein a plurality of radially movable detents, tumblers rotatively mounted on said core and having detent-releasing recesses which when aligned with the cooperating detents set the lock for release, said tumblers having engaging parts whereby the one will move the other, the primary tumbler having ratchet-acting teeth, an oscillatory tumbler actuator arranged for repeated like movements and provided with a driving dog operative on said ratchet teeth to impart step by step movements to said primary tumbler, and a lock actuator rotatively mounted in said core and provided with a cam-acting portion normally held by said detents so that said lock actuator cannot be moved far enough to release the lock, but operative on said detents to release the lock when and only when the several tumblers are all set in lock-releasing positions.

16. The structure defined in claim 15 in which the primary tumbler has a plurality of shallow recesses into which the cooperating detent will be forced by a movement of said lock actuator less than that required to operate the lock and by which engagement said primary tumbler will be temporarily locked against rotation.

17. The structure defined in claim 15 in which the primary tumbler has a plurality of shallow recesses into which the cooperating detent will be forced by a movement of said lock actuator less than that required to operate the lock and by which engagement said primary tumbler will be temporarily locked against rotation, the said lock actuator being normally free for sufficient backward rotation to set the several tumblers in zero positions.

18. The structure defined in claim 1 in which said tumbler actuator has a tumbler-driving element held out of action except at the close limit of its extreme movement.

19. The structure defined in claim 1 in which said tumbler actuator is yieldingly held in an intermediate position.

20. The structure defined in claim 1 in which said tumbler actuator has reversely-acting driving elements held out of action in the intermediate position of said tumbler actuator but operative at the opposite near limits of extreme movement thereof.

21. The structure defined in claim 1 in which said tumbler actuator has reversely-acting driving elements held out of action in the intermediate position of said tumbler actuator but operative at the opposite near limits of extreme movement thereof, and yielding means normally holding said tumbler actuator in an intermediate position.

22. The structure defined in claim 5 in which said tumbler actuator is provided with reversely-acting driving dogs and the primary member of said tumblers is provided with ratchet teeth with which said dogs are engageable, and means holding said dogs out of action in the intermediate position of said tumbler actuator but permitting and causing the same to operate at the near extremes of its opposite movements.

23. A combination lock comprising a relatively fixed core having therein a plurality of radially movable detents, tumblers rotatively mounted on said core and having detent-releasing recesses which when aligned with the cooperating detents set the lock for release, said tumblers having engaging parts whereby the one will move the other, the primary tumbler having ratchet-acting teeth, an oscillatory tumbler actuator arranged for repeated like movements and provided with reversely-acting driving dogs operative on the teeth of said primary tumbler to impart step by step movement thereto, and means holding said reversely-acting dogs out of action when the said tumbler actuator is in an intermediate position.

24. The structure defined in claim 23 in further combination with yielding means normally holding said tumbler actuator in an intermediate position.

25. The structure defined in claim 14 in which the engaging parts of said tumblers are circumferentially adjustable.

26. The structure defined in claim 14 in which the engaging elements of said tumblers are projecting lugs and in which one of the tumblers has such lugs located one on each side of the lug of an adjacent tumbler.

27. The structure defined in claim 14 in which the engaging elements of said tumblers are projecting lugs and in which one of the tumblers has such lugs located one on each side of the lug of an adjacent tumbler, certain of said lugs being circumferentially adjustable to vary the predetermined combination.

28. The structure defined in claim 1 in which the tumblers are provided with cooperating driving lugs, certain of which are adjustable, the one in respect to the other to vary the combination.

29. The structure defined in claim 15 in which said tumbler actuator is provided with reversely-acting dogs operative on the ratchet teeth of the primary tumbler, and means holding said dogs out of action in the intermediate position of said tumbler actuator.

30. The structure defined in claim 3 in which the primary member of the tumblers has ratchet-acting teeth and said tumbler actuator is provided with reversely-acting driving dogs operative on said teeth, said dogs being held out of action in the intermediate position of said tumbler actuator.

In testimony whereof I affix my signature.

ARTHUR L. BEARD.